(12) United States Patent
Wang et al.

(10) Patent No.: US 9,406,331 B1
(45) Date of Patent: Aug. 2, 2016

(54) METHOD FOR MAKING ULTRA-NARROW READ SENSOR AND READ TRANSDUCER DEVICE RESULTING THEREFROM

(71) Applicant: Western Digital (Fremont), LLC, Fremont, CA (US)

(72) Inventors: Miao Wang, San Jose, CA (US); Wei Gao, Fremont, CA (US); Xiaoyu Yang, Union City, CA (US); Anup G. Roy, Fremont, CA (US); Wei Zhang, Fremont, CA (US); Wencheng Su, Cupertino, CA (US); Zhihong Zhang, Fremont, CA (US); James Yuan, Fremont, CA (US); Guanxiong Li, Fremont, CA (US); Ming Mao, Dublin, CA (US); Hai Sun, Milpitas, CA (US); Lingyun Miao, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 196 days.

(21) Appl. No.: 13/929,633

(22) Filed: Jun. 27, 2013

Related U.S. Application Data

(60) Provisional application No. 61/835,913, filed on Jun. 17, 2013.

(51) Int. Cl.
 *B44C 1/22* (2006.01)
 *G11B 5/84* (2006.01)
 *G11B 5/127* (2006.01)

(52) U.S. Cl.
 CPC .............. *G11B 5/8404* (2013.01); *G11B 5/127* (2013.01)

(58) Field of Classification Search
 USPC ................................................ 216/22, 41, 58
 See application file for complete search history.

(56) References Cited

U.S. PATENT DOCUMENTS

| | | |
|---|---|---|
| 4,502,914 A | 3/1985 | Trumpp et al. |
| 4,508,579 A | 4/1985 | Goth et al. |
| 5,199,090 A | 3/1993 | Bell |
| 5,438,747 A | 8/1995 | Krounbi et al. |
| 5,612,255 A | 3/1997 | Chapple-Sokol et al. |
| 5,618,383 A | 4/1997 | Randall |
| 5,795,830 A | 8/1998 | Cronin et al. |
| 5,867,890 A | 2/1999 | Hsiao et al. |
| 5,874,010 A | 2/1999 | Tao et al. |
| 6,016,290 A | 1/2000 | Chen et al. |
| 6,018,441 A | 1/2000 | Wu et al. |
| 6,025,978 A | 2/2000 | Hoshi et al. |
| 6,025,988 A | 2/2000 | Yan |
| 6,032,353 A | 3/2000 | Hiner et al. |
| 6,033,532 A | 3/2000 | Minami |
| 6,034,851 A | 3/2000 | Zarouri et al. |
| 6,043,959 A | 3/2000 | Crue et al. |
| 6,043,960 A | 3/2000 | Chang et al. |
| 6,046,885 A | 4/2000 | Aimonetti et al. |

(Continued)

OTHER PUBLICATIONS

John N. Randall, et al., "Fifteen nanometer features by sidewall processing and pattern transfer," IEEE Journal of Science, vol. 1, Nov./Dec. 1994, pp. 1-4.

(Continued)

*Primary Examiner* — Shamim Ahmed

(57) ABSTRACT

Disclosed are methods for making ultra-narrow track width (TW) read sensors, and read transducers incorporating such sensors. The methods utilize side-wall line patterning techniques to prepare ultra-narrow mill masks that can be used to prepare the ultra-narrow read sensors.

23 Claims, 12 Drawing Sheets

(56) References Cited

U.S. PATENT DOCUMENTS

| | | |
|---|---|---|
| 6,049,650 A | 4/2000 | Jerman et al. |
| 6,055,138 A | 4/2000 | Shi |
| 6,058,094 A | 5/2000 | Davis et al. |
| 6,063,688 A | 5/2000 | Doyle et al. |
| 6,073,338 A | 6/2000 | Liu et al. |
| 6,078,479 A | 6/2000 | Nepela et al. |
| 6,081,499 A | 6/2000 | Berger et al. |
| 6,094,803 A | 8/2000 | Carlson et al. |
| 6,099,362 A | 8/2000 | Viches et al. |
| 6,103,073 A | 8/2000 | Thayamballi |
| 6,108,166 A | 8/2000 | Lederman |
| 6,118,629 A | 9/2000 | Huai et al. |
| 6,118,638 A | 9/2000 | Knapp et al. |
| 6,125,018 A | 9/2000 | Takagishi et al. |
| 6,130,779 A | 10/2000 | Carlson et al. |
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,291,137 B1 | 9/2001 | Lyons et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,423,475 B1 | 7/2002 | Lyons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,472,107 B1 | 10/2002 | Chan |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,566,280 B1 | 5/2003 | Meagley et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |

(56) References Cited

U.S. PATENT DOCUMENTS

| | | |
|---|---|---|
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,703,312 B2 | 3/2004 | Golz et al. |
| 6,704,158 B2 | 3/2004 | Hawwa et al. |
| 6,706,571 B1 | 3/2004 | Yu et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,014 B2 | 5/2004 | Lin et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Chen et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,131 B1 | 10/2004 | Hesselink et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Spallas et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,177 B2 | 3/2005 | Pinarbasi et al. |
| 6,861,937 B1 | 3/2005 | Feng et al. |
| 6,862,798 B2 | 3/2005 | Kruger et al. |
| 6,870,712 B2 | 3/2005 | Chen et al. |
| 6,872,467 B2 | 3/2005 | Qian et al. |
| 6,873,494 B2 | 3/2005 | Chen et al. |
| 6,873,547 B1 | 3/2005 | Shi et al. |
| 6,875,703 B1 | 4/2005 | Furukawa et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,893,972 B2 | 5/2005 | Rottstegge et al. |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,983,531 B2 | 1/2006 | Horng et al. |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,015,124 B1 | 3/2006 | Fisher et al. |
| 7,023,658 B1 | 4/2006 | Knapp et al. |
| 7,024,756 B2 | 4/2006 | Le et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,070,698 B2 | 7/2006 | Le |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,115,525 B2 | 10/2006 | Abatchev et al. |
| 7,116,517 B1 | 10/2006 | He et al. |
| 7,120,988 B2 | 10/2006 | Le et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,230 B2 | 11/2006 | Saga et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,155,732 B2 | 12/2006 | Rausch et al. |
| 7,170,725 B1 | 1/2007 | Zhou et al. |
| 7,177,117 B1 | 2/2007 | Jiang et al. |
| 7,186,348 B2 | 3/2007 | Chen et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et |
| 7,212,384 B1 | 5/2007 | Stoev et a |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,291,560 B2 | 11/2007 | Parascandola et al. |

(56) References Cited

U.S. PATENT DOCUMENTS

| | | | |
|---|---|---|---|
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,345,370 B2 | 3/2008 | Furukawa et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,355,813 B2 | 4/2008 | Kruger et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,380,332 B2 | 6/2008 | Bedell et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,441,325 B2 | 10/2008 | Gao et al. |
| 7,443,632 B1 | 10/2008 | Stoev et al. |
| 7,444,740 B1 | 11/2008 | Chung et al. |
| 7,464,457 B2 | 12/2008 | Le et al. |
| 7,469,467 B2 | 12/2008 | Gao et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,531,456 B2 | 5/2009 | Kwon et al. |
| 7,542,246 B1 | 6/2009 | Song et al. |
| 7,547,640 B2 | 6/2009 | Abatchev et al. |
| 7,551,406 B1 | 6/2009 | Thomas et al. |
| 7,552,523 B1 | 6/2009 | He et al. |
| 7,554,767 B1 | 6/2009 | Hu et al. |
| 7,562,436 B2 | 7/2009 | Jayasekara |
| 7,583,466 B2 | 9/2009 | Kermiche et al. |
| 7,595,967 B1 | 9/2009 | Moon et al. |
| 7,639,457 B1 | 12/2009 | Chen et al. |
| 7,660,080 B1 | 2/2010 | Liu et al. |
| 7,666,578 B2 | 2/2010 | Fischer et al. |
| 7,672,080 B1 | 3/2010 | Tang et al. |
| 7,672,086 B1 | 3/2010 | Jiang |
| 7,684,160 B1 | 3/2010 | Erickson et al. |
| 7,687,408 B2 | 3/2010 | Abatchev et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |

(56) References Cited

U.S. PATENT DOCUMENTS

| | | |
|---|---|---|
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,333,898 B2 | 12/2012 | Brown et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 8,711,518 B1 | 4/2014 | Zeng et al. |
| 8,711,528 B1 | 4/2014 | Xiao et al. |
| 8,717,709 B1 | 5/2014 | Shi et al. |
| 8,720,044 B1 | 5/2014 | Tran et al. |
| 8,721,902 B1 | 5/2014 | Wang et al. |
| 8,724,259 B1 | 5/2014 | Liu et al. |
| 8,749,790 B1 | 6/2014 | Tanner et al. |
| 8,749,920 B1 | 6/2014 | Knutson et al. |
| 8,753,903 B1 | 6/2014 | Tanner et al. |
| 8,760,807 B1 | 6/2014 | Zhang et al. |
| 8,760,818 B1 | 6/2014 | Diao et al. |
| 8,760,819 B1 | 6/2014 | Liu et al. |
| 8,760,822 B1 | 6/2014 | Li et al. |
| 8,760,823 B1 | 6/2014 | Chen et al. |
| 8,763,235 B1 | 7/2014 | Wang et al. |
| 8,780,498 B1 | 7/2014 | Jiang et al. |
| 8,780,505 B1 | 7/2014 | Xiao |
| 8,786,983 B1 | 7/2014 | Liu et al. |
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |

(56) References Cited

U.S. PATENT DOCUMENTS

| | | | |
|---|---|---|---|
| 8,797,686 B1 | 8/2014 | Bai et al. | |
| 8,797,692 B1 | 8/2014 | Guo et al. | |
| 8,813,324 B2 | 8/2014 | Emley et al. | |
| 2001/0001256 A1 | 5/2001 | Hsiao | |
| 2002/0034043 A1* | 3/2002 | Okada et al. | 360/125 |
| 2002/0142603 A1 | 10/2002 | Chang et al. | |
| 2004/0229430 A1 | 11/2004 | Findeis et al. | |
| 2005/0024779 A1 | 2/2005 | Le et al. | |
| 2005/0066517 A1 | 3/2005 | Bedell et al. | |
| 2005/0117251 A1 | 6/2005 | Matono et al. | |
| 2005/0185332 A1 | 8/2005 | Hsiao et al. | |
| 2005/0241140 A1 | 11/2005 | Baer et al. | |
| 2005/0264949 A1 | 12/2005 | Gao et al. | |
| 2006/0028762 A1 | 2/2006 | Gao et al. | |
| 2006/0046422 A1 | 3/2006 | Tran et al. | |
| 2006/0067001 A1 | 3/2006 | Hsu et al. | |
| 2006/0174474 A1 | 8/2006 | Le | |
| 2006/0234483 A1 | 10/2006 | Araki et al. | |
| 2006/0258162 A1 | 11/2006 | Abatchev et al. | |
| 2006/0273456 A1 | 12/2006 | Sant et al. | |
| 2006/0281266 A1 | 12/2006 | Wells | |
| 2006/0288565 A1 | 12/2006 | Le et al. | |
| 2007/0026537 A1 | 2/2007 | Jiang et al. | |
| 2007/0026538 A1 | 2/2007 | Jayasekara | |
| 2007/0113395 A1 | 5/2007 | Dulay et al. | |
| 2007/0159720 A1 | 7/2007 | Sohn et al. | |
| 2007/0165495 A1 | 7/2007 | Lee et al. | |
| 2007/0183093 A1 | 8/2007 | Le et al. | |
| 2007/0245544 A1 | 10/2007 | Allen et al. | |
| 2007/0245545 A1 | 10/2007 | Pentek et al. | |
| 2007/0258167 A1 | 11/2007 | Allen et al. | |
| 2008/0072417 A1 | 3/2008 | Hsu et al. | |
| 2008/0081461 A1 | 4/2008 | Lee et al. | |
| 2008/0090418 A1 | 4/2008 | Jeon et al. | |
| 2008/0149809 A1 | 6/2008 | Hamann et al. | |
| 2009/0017627 A1* | 1/2009 | Greeley | H01L 21/0337 438/697 |
| 2009/0053651 A1 | 2/2009 | Hatakeyama et al. | |
| 2009/0090418 A1 | 4/2009 | Parris et al. | |
| 2009/0266790 A1 | 10/2009 | Balamane et al. | |
| 2009/0310256 A1 | 12/2009 | Albrecht et al. | |
| 2010/0024201 A1 | 2/2010 | Le et al. | |
| 2010/0290157 A1 | 11/2010 | Zhang et al. | |
| 2011/0086240 A1 | 4/2011 | Xiang et al. | |
| 2012/0111826 A1 | 5/2012 | Chen et al. | |
| 2012/0129349 A1* | 5/2012 | Kang et al. | 438/700 |
| 2012/0216378 A1 | 8/2012 | Emley et al. | |
| 2012/0237878 A1 | 9/2012 | Zeng et al. | |
| 2012/0298621 A1 | 11/2012 | Gao | |
| 2013/0005113 A1* | 1/2013 | Kakegawa | 438/382 |
| 2013/0216702 A1 | 8/2013 | Kaiser et al. | |
| 2013/0216863 A1 | 8/2013 | Li et al. | |
| 2013/0257421 A1 | 10/2013 | Shang et al. | |
| 2014/0154529 A1 | 6/2014 | Yang et al. | |
| 2014/0170774 A1* | 6/2014 | Mao et al. | 438/3 |
| 2014/0175050 A1 | 6/2014 | Zhang et al. | |

OTHER PUBLICATIONS

Michael Kautzky, et al., "The Application of Collimated Sputtering to Abutted Junction Reader Processing," DataTech, date of publication is prior to Jun. 2013, pp. 1-7.

Gao, U.S. Appl. No. 13/115,621, filed May 25, 2011, 21 pages.

Gao, et al., U.S. Appl. No. 13/309,357, filed Dec. 1, 2011, 29 pages.

* cited by examiner

METHOD FOR MAKING ULTRA-NARROW READ SENSOR AND READ TRANSDUCER DEVICE RESULTING THEREFROM

RELATED CASES

This application claims the benefit of U.S. Provisional Application Ser. No. 61/835,913 filed Jun. 17, 2013, which is hereby incorporated herein by reference in the entirety.

TECHNICAL FIELD

This disclosure relates to the field of read sensors, and their methods of manufacture.

BACKGROUND

Computer hard drives store data by affecting the magnetic field of memory cells on a hard drive disk. The stored data is read by passing a read head sensor above a memory cell to respond to, and thus detect, the orientation of the magnetic field in the memory cell. The smaller the memory cells on the hard drive disk, the more densely they can be packed, increasing the density of data storage possible on a hard drive disk.

However, making smaller memory cells is not all that is required to increase data density storage capacity. Increasingly smaller memory cells require increasingly smaller read sensors, particularly read sensors with a narrow track width, in order to be responsive to the magnetic field of a single memory cell.

Currently there is no commercial lithography tool than can provide read sensors with line widths less than about 30 nm.

BRIEF DESCRIPTION OF THE DRAWINGS

The present application is illustrated by way of example, and not limitation, in the figures of the accompanying drawings in which.

DETAILED DESCRIPTION

Disclosed are methods for making ultra-narrow track width (TW) read sensors and read transducers incorporating such sensors. The methods utilize side-wall line patterning techniques to prepare ultra-narrow mill masks that can be used to prepare the read sensors.

In the following description, numerous specific details are set forth to provide a thorough understanding of various embodiment of the present invention. It will be apparent however, to one skilled in the art that these specific details need not be employed to practice various embodiments of the present invention. In other instances, well known components or methods have not been described in detail to avoid unnecessarily obscuring various embodiments of the present invention.

As used herein, the phrase "ultra-narrow" refers to a dimension on the order of less than about 35 nm; such as between about 3 and 35 nm; such as between about 5 and 30 nm; such as between about 5 and 25 nm; such as between about 5 and 20 nm; such as between about 7 and 18 nm; or between about 5 and 10 nm; such as between about 5 and 7 nm; or between about 10 and 18 nm.

Currently there is no commercial lithography tool than can provide 10-20 nm linewidth structures. Described herein are side-wall line patterning techniques that are capable of delivering ultra-narrow linewidth structures. In particular, the side-wall line patterning techniques described herein are capable of delivering well defined linewidths controlled by thickness of a conformally deposited material. In particular, the conformally deposited material may be applied via an atomic layer deposition technique or the like, which allows for controlled deposition across a wide range of thicknesses as needed for desired reader design and fabrication requirements. Further, in some embodiments, the conformally deposited material is deposited under such conditions as to provide a high degree of CD uniformity. When deposited so as to provide a coating on a side-wall of a layered structure, the resulting coated structure can be further processed according to appropriate etching chemistries known in the art to provide an ultra-narrow mill mask on a substrate, which allows for further patterning so as to prepare an ultra-narrow reader junction for use in a read sensor.

Figure 1:
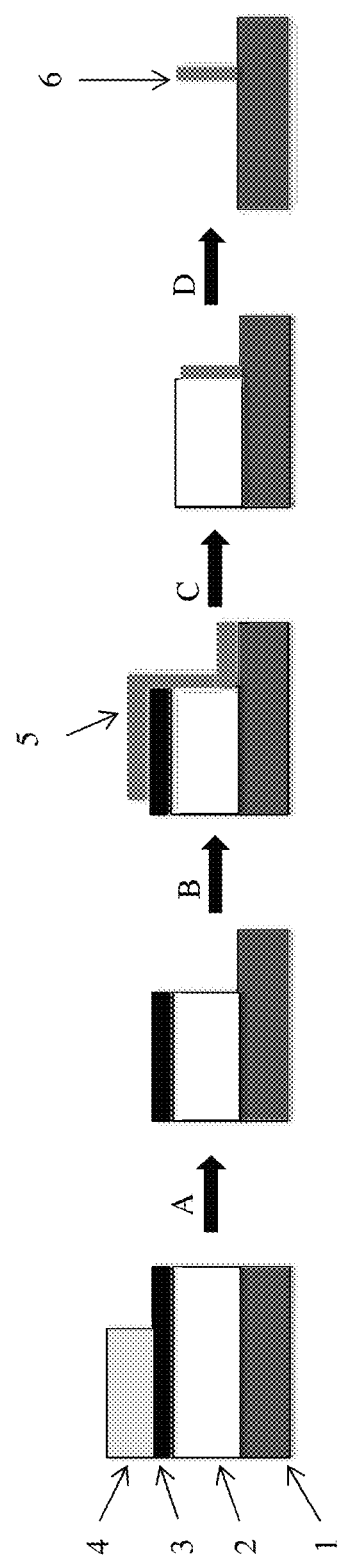
FIG. 1 illustrates steps in an exemplary method for preparing an ultra-narrow mill mask using a side-wall line deposition technique.

An exemplary embodiment of a side-wall patterning technique usable to deliver linewidth structures is shown in FIG. 1. As seen in FIG. 1, the side-wall line patterning techniques may comprise deposition of one or more sacrificial layers above a substrate, where each sacrificial layer comprises a material that is susceptible to an etching chemistry, such as a reactive ion etching chemistry.

As will be understood by one of skill in the art, any suitable deposition technique, including vapor deposition, may be used depending on the desired composition of the one or more sacrificial layers. In some embodiments, the one or more sacrificial layers comprises a layer of amorphous carbon. In such embodiments, the amorphous carbon may be deposited by vapor deposition. Various thicknesses of the amorphous carbon layer may be used. In some embodiments, the thickness is less than or equal to about 100 nm thick. In addition, or in the alternative, the one or more sacrificial layers comprises a layer of tantalum. Like amorphous carbon, tantalum may also be deposited by vapor deposition. Again, various thicknesses may be used, such as less than or equal to about 40 nm. In some embodiments, the one or more sacrificial layers may comprise a plurality of sacrificial layers. In one particular exemplary embodiment, the one or more sacrificial layers comprise a tantalum layer on top of an amorphous carbon layer.

In some embodiments, a masking layer is applied to at least a portion of the uppermost sacrificial layer after the one or more sacrificial layers are in place. The masking layer may comprise a material that is not susceptible to the same reactive ion etching chemistry as the uppermost sacrificial layer. In some embodiments, the masking layer is applied as a photo-resist pattern leaving at a portion of the uppermost sacrificial layer exposed. The masking layer may be applied such that an edge of the masking layer defines a straight line along an exposed portion of the uppermost sacrificial layer.

An intermediate structure prepared according to such a method is shown as the starting point of sequence in FIG. 1. The initial structure comprises a substrate 1, two sacrificial layers 2 and 3, and a masking layer 4.

Figure 2:
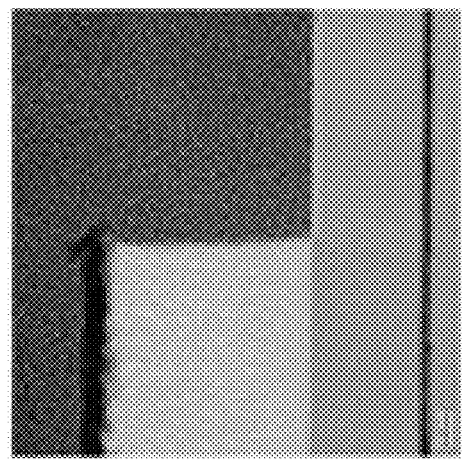
FIG. 2 is a SEM image of a side-wall structure formed as a intermediate structure during the exemplary method shown in FIG. 1.

Once the masking layer 4 is in place, the layered structure is subjected to reactive ion etching chemistries selected to etch the exposed portion of the sacrificial layers. The masking layer protects the covered portion of the sacrificial layers, thereby creating a vertical side-wall structure defined by the sacrificial layer materials. In the exemplary method shown in FIG. 1, the masking layer 4 is then removed, exposing a horizontal surface of the uppermost sacrificial layer, and leading to the layered structure seen between steps A and B. A SEM image of such an exemplary intermediate layered structure is also seen in FIG. 2.

A material capable of conformal deposition is then applied to layered structure, coating the horizontal and vertical surfaces. As used herein, a material capable of "conformal" deposition is a material that is deposited as a coating with substantially even thickness, regardless of the orientation of the surfaces it is being deposited on. In this regard, substantially even thickness means that the variation between surface thickness is less than or equal to about 10%, such as less than or equal to about 5%, such as less than or equal to about 2%, regardless of surface orientation. In some embodiments, this conformally deposited material is not susceptible to the same reactive ion etching chemistry as at least one of the sacrificial layers. In the exemplary method shown in FIG. 1, the conformally deposited layer 5 applied in step B.

In some embodiments, the conformally deposited material is applied via atomic layer deposition. In some embodiments, the conformally deposited material comprises alumina (i.e. aluminum oxide). However, it is not intended that the methods described herein are limited to any particular conformally deposited material being applied by any particular fashion. As described above, it is sufficient that the material is capable of being conformally deposited at a desired thickness, and that the material is not susceptible to the same reactive ion etching chemistry as at least one of the sacrificial layers.

Figure 3:
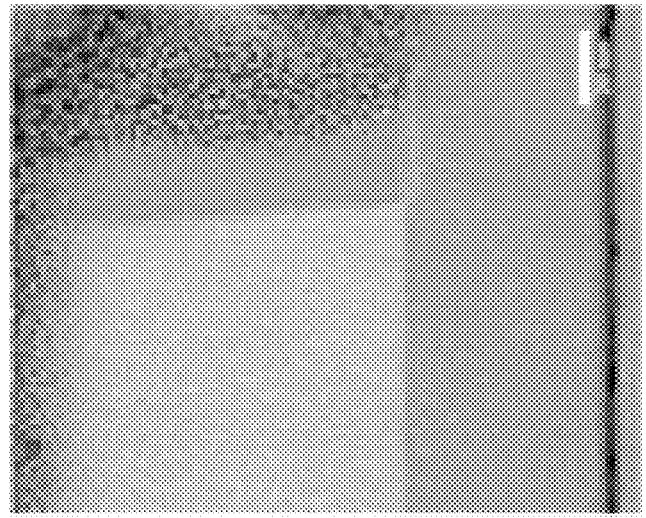
FIG. 3 is a SEM image of a side-wall line structure formed as a intermediate structure during the exemplary method shown in FIG. 1.

Once the material has been conformally deposited, the deposited material covering a horizontal surface of the uppermost sacrificial layer is removed in a way that leaves at least a portion of the material covering a vertical surface intact. This removal may be accomplished by any method known in the art, including a reactive ion etching specifically targeted to the conformally deposited material. Removal of the conformally deposited material from a horizontal surface of the uppermost sacrificial layer, and subsequent removal of the uppermost sacrificial layer, is seen as step C in FIG. 1. A SEM image of such an exemplary intermediate structure with a side-wall coating is seen in FIG. 3.

What remains is at least one sacrificial layer defining a vertical side-wall that is coated with the conformally deposited material. As will be appreciated, the thickness of the side-wall coating is determined by the thickness of the initial conformal deposition. In this regard, atomic layer deposition is particularly useful, as the thickness of the deposited layer can by finely controlled, allowing for deposition of a layer of virtually any desired thickness, such as a thickness less than about 35 nm; such as between about 3 and 35 nm; such as between about 5 and 30 nm; such as between about 5 and 25 nm; such as between about 5 and 20 nm; such as between about 7 and 18 nm; or between about 5 and 10 nm; such as between about 5 and 7 nm; or between about 10 and 18 nm.

Figure 4:
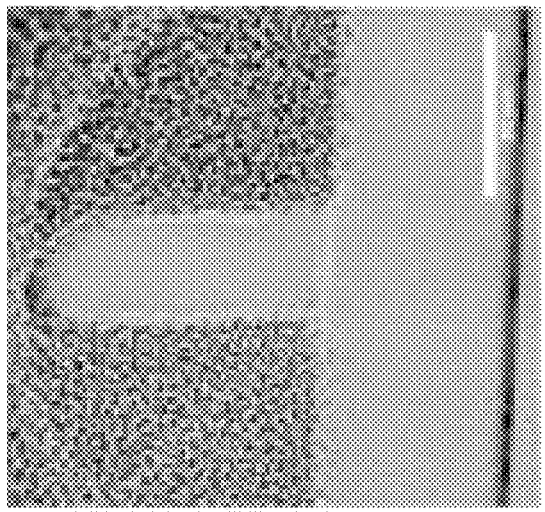
FIG. 4 is a SEM image of an ultra-narrow mill mask formed from the exemplary method shown in FIG. 1.

The remaining structure may then be subjected to reactive ion etching specifically directed to remove all remaining sacrificial layer material, leaving a ultra-narrow line structure that can be used to serve as a mill mask for further processing of the underlying substrate. This removal step is shown in FIG. 1 as step D, with the resulting ultra-narrow mill mask 6 atop substrate 1. A SEM image of such an exemplary ultra-narrow mill mask atop a substrate is seen in FIG. 4.

Figure 5:
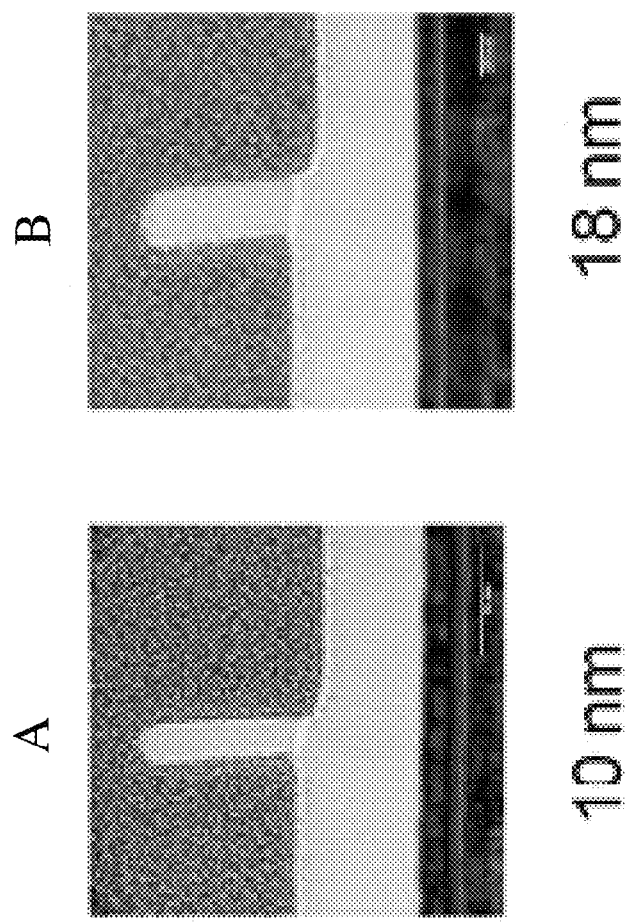
FIGS. 5A and 5B are SEM images of two alumina mill masks (at about 10 nm and 18 nm thick, respectively) prepared according to one exemplary method.

Given the fact that the thickness of the conformal coating ultimately determines the thickness of the mill mask, various embodiments of the methods described herein may be used to provide mill masks with ultra-narrow critical dimension. For instance, SEM images of two exemplary ultra-narrow mill masks produced by methods described herein are shown in FIG. 5. The thicknesses of the shown ultra-narrow mill masks were measured to be about 10 nm (FIG. 5A) and 18 nm (FIG. 5B), although thinner mill masks have been produced.

Figure 6:
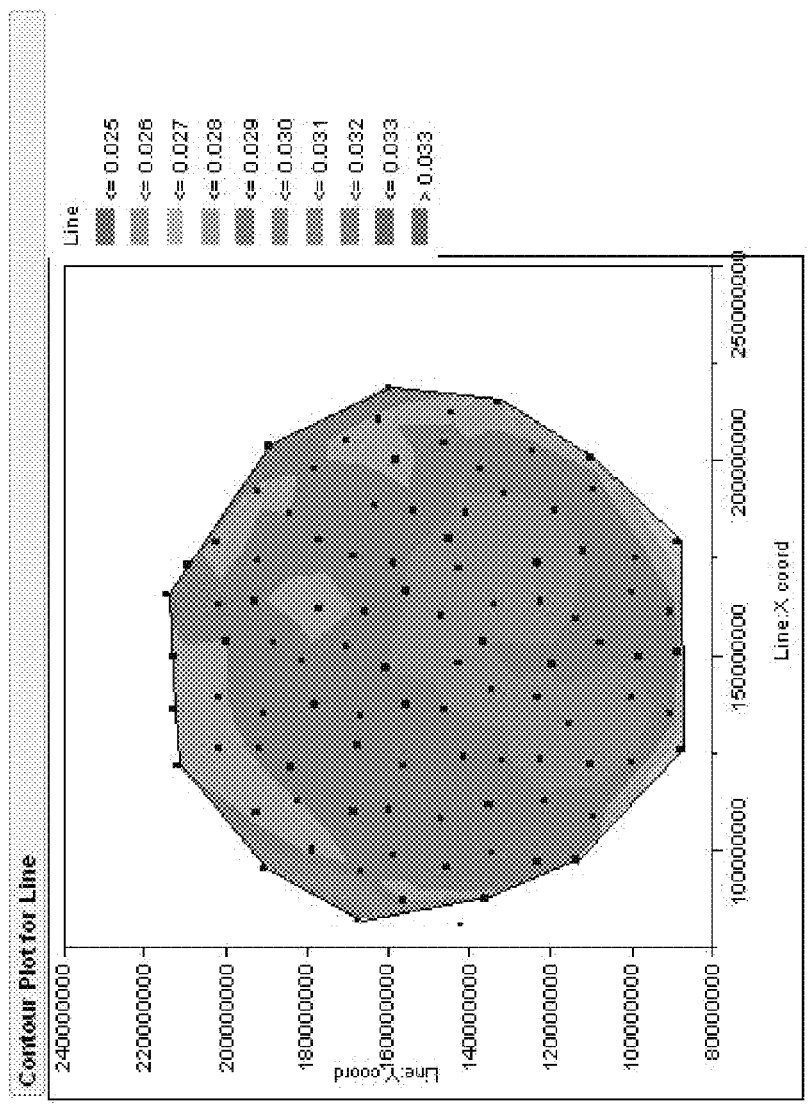
FIG. 6 is a contour plot showing critical dimension uniformity of line structures prepared according to an exemplary method.

An additional feature of some of the ultra-narrow mill masks produced by some of the embodiments presented herein results from the consistent thickness that a conformal coating may be applied. That is, ultra-narrow mill masks produced by various embodiments of the methods described herein may exhibit high critical dimension uniformity. For instance, a side-wall patterned mill mask may have a critical dimension uniformity (expressed as within wafer variation) of less than about 1 nm; such as less than about 0.75 nm; such as less than about 0.6 nm. An contour plot demonstrating such critical dimension uniformity for a mill mask produced according to one embodiment is seen in FIG. 6. Observed within wafer variation (WIW sigma) for this example was about 0.58 nm.

Further, it is intended that a substrate may be any suitable material or structure. In particular, a substrate may be a read sensor stack comprising a plurality of layers. In such embodiments, a side-wall patterned mill mask may be used to further process the substrate to make a read sensor with an ultra-narrow track width.

In some embodiments, a substrate comprises an uppermost layer comprising a material that is susceptible to a reactive ion etching chemistry that is different from any of the one or more sacrificial layers. This uppermost layer may be of any suitable thickness, which may be selected based on the chemical identity of the uppermost substrate layer. In some embodiments, the uppermost substrate layer comprises silicon carbide (SiC). If present as the uppermost substrate layer, silicon carbide may be at any desired thickness, including a thickness of about 50 nm or less.

The substrate may further comprise an etch stop layer found directly beneath the uppermost substrate layer. In such embodiments, the etch stop layer comprises a material that is not susceptible to the same reactive ion etching chemistry as the uppermost substrate layer. Again, this uppermost layer may be of any suitable thickness, which may be selected based on the chemical identity of the etch stop layer. In some embodiments, the etch stop layer may comprise a chromium layer; such as a chromium layer that is about 25 Å thick.

Figure 7:
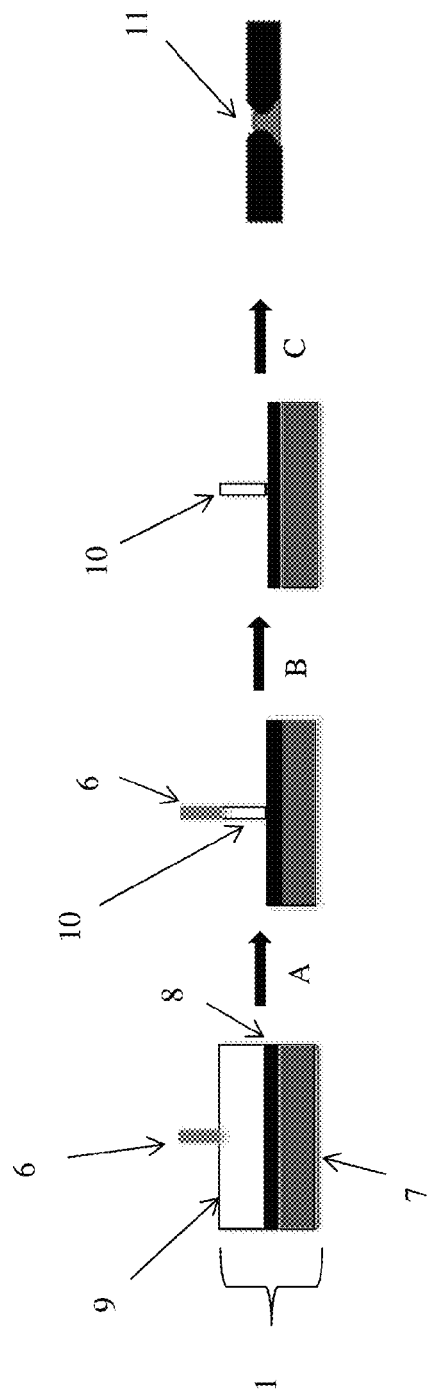
FIG. 7 illustrates steps for preparing an ultra-narrow read sensor using an ultra-narrow mill mask according to one exemplary method.
Figure 8:
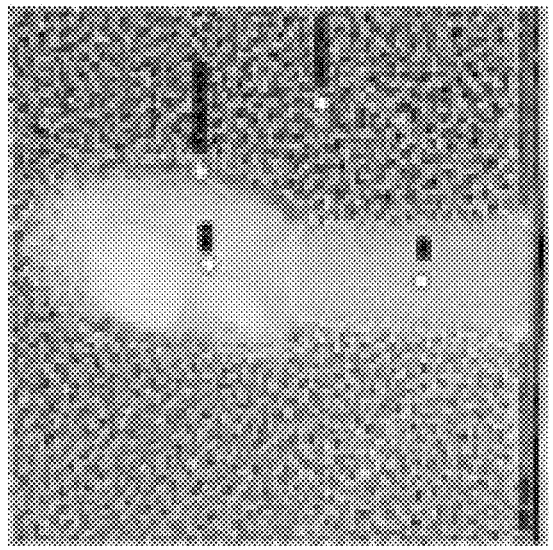
FIG. 8 is a SEM image of an alumina mill mask remaining above a SiC ultra-narrow line structure prepared as an intermediate step in the exemplary method seen in FIG. 7.
Figure 9:
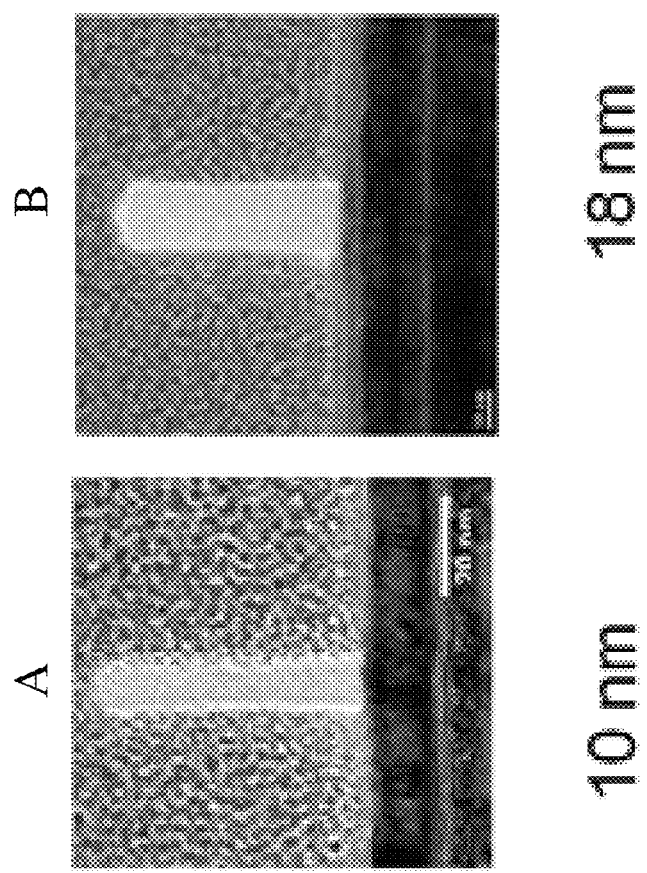
FIGS. 9A and 9B are SEM images of two SiC ultra-narrow line structures (at about 10 nm and 18 nm thick, respectively) prepared as an intermediate step in the exemplary method seen in FIG. 7.

One exemplary method of processing a multilayered substrate into a reader junction is seen in FIG. 7. The initial structure comprises a multi-layered substrate 1 comprising a base layer 7, an etch stop layer 8, and an uppermost substrate layer 9. In the method shown in FIG. 7, the uppermost substrate layer 9 is subjected to a reactive ion etch so as to remove portions of the substrate layer 9 not protected by the mill mask 6. The resulting line structure is a layered line structure comprising the original mill mask above the protected portion of the substrate layer 9 (shown in FIG. 7 as the structure following step A). A SEM image of an exemplary layered line structure prepared according to this method is shown in FIG. 8.

Figure 10:
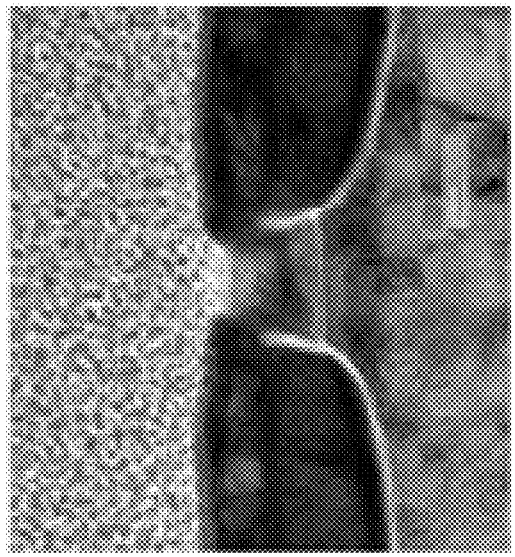
FIG. 10 is a SEM image of a ultra-narrow reader junction prepared according to the exemplary method seen in FIG. 7.

The original mill mask may then be removed, leaving a line structure 10 formed of the uppermost substrate material, and with about the same thickness of the original mill mask. SEM images of two exemplary line structures are seen in FIGS. 8A (about 10 nm thick) and 8B (about 18 nm thick). The remaining substrate and line structure may then be processed by techniques known in the art to form a reader junction with a track width equal to about the thickness of the line structure 10. A SEM image of an example of a reader junction prepared by this method is seen in FIG. 10.

Figure 11:
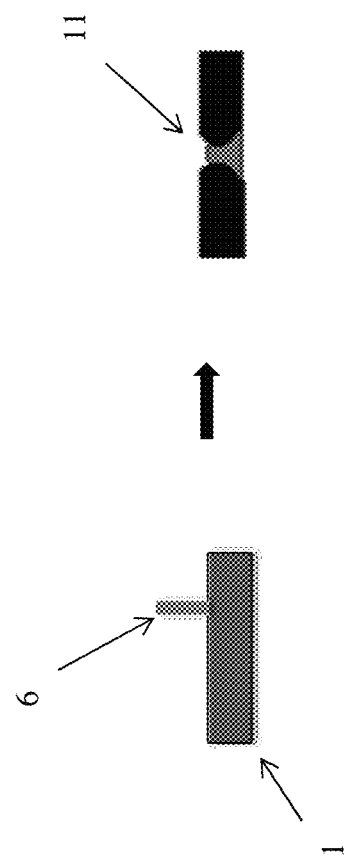
FIG. 11 illustrates steps for preparing an ultra-narrow read sensor using an ultra-narrow mill mask according to another exemplary method.
Figure 12:
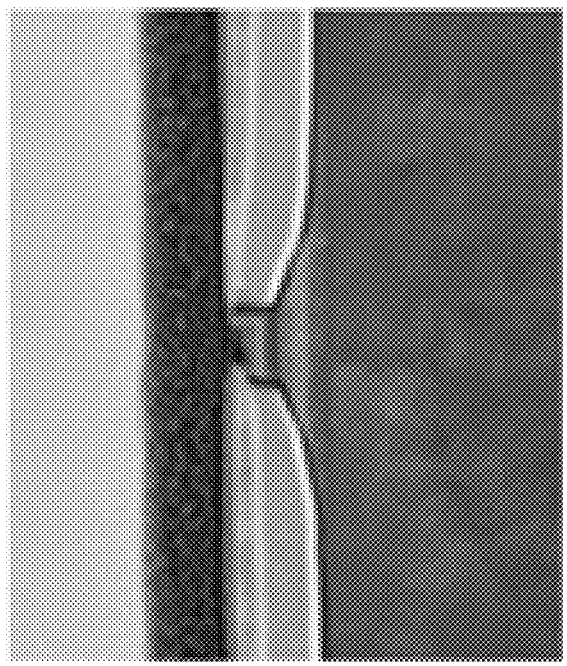
FIG. 12 is a SEM image of a ultra-narrow reader junction prepared according to the exemplary method seen in FIG. 11.

Another exemplary method for further processing a reader stack substrate into a reader junction is seen in FIG. 11. This exemplary method is simpler than that seen in FIG. 7 in that the side-wall line patterned mill mask 6 is used directly to pattern a reader junction 11. In these embodiments, the substrate may comprise a tunneling magnetoresistive (TMR) surface. A SEM image of an example of a reader junction prepared by this method is seen in FIG. 12.

As such, methods described herein may be used to prepare read sensors comprising a read junction track width of less than about 35 nm; such as between about 3 and 35 nm; such as between about 5 and 30 nm; such as between about 5 and 25 nm; such as between about 5 and 20 nm; such as between about 7 and 18 nm; or between about 5 and 10 nm; such as between about 5 and 7 nm; or between about 10 and 18 nm. Similarly, these read sensors may be used to prepare transducers comprising read sensors with a read junction track width of less than about 35 nm; such as between about 3 and 35 nm; such as between about 5 and 30 nm; such as between about 5 and 25 nm; such as between about 5 and 20 nm; such as between about 7 and 18 nm; or between about 5 and 10 nm; such as between about 5 and 7 nm; or between about 10 and 18 nm.

In the foregoing specification, embodiments of the disclosure have been described with reference to specific exemplary features thereof. It will, however, be evident that various modifications and changes may be made thereto without departing from the broader spirit and scope of the disclosure. The specification and figures are, accordingly, to be regarded in an illustrative rather than a restrictive sense.

That which is claimed is:

1. A method for making a read sensor, the method comprising:
    depositing a read sensor stack on a substrate, wherein the read sensor stack comprises a plurality of layers;
    providing a mill mask above the read sensor stack, wherein the mill mask is a line structure comprising alumina deposited via a side-wall line patterning technique, wherein the mill mask has critical dimension uniformity of less than about 1 nm; and
    patterning the read sensor stack.

2. The method of claim 1, wherein the mill mask comprises a material forming a conformal deposition.

3. The method of claim 1, wherein the mill mask comprises a line structure with a thickness within the range of about 3 to 35 nm.

4. The method of claim 1, wherein the mill mask comprises a line structure with a thickness within the range of about 5 to 20 nm.

5. The method of claim 1, wherein prior to providing the mill mask above the read sensor stack, the method further comprises depositing above the read sensor stack a first layer susceptible to a first reactive ion etching chemistry.

6. The method of claim 5, wherein after the mill mask is provided but before patterning the read sensor stack, the method further comprises performing a first reactive ion etch to remove at least a portion of the first layer not covered by the mill mask; and removing the mill mask from the remaining first layer material.

7. The method of claim 5, further comprising depositing a second layer above the read sensor stack prior to depositing the first layer; wherein the second layer comprises a material not susceptible the first reactive ion etching chemistry.

8. The method of claim 5, wherein the second layer comprises a chromium (Cr) layer.

9. The method of claim 5, wherein the layer susceptible a first reactive ion etching chemistry is a silicon carbide (SiC) layer.

10. A method for making an side-wall patterned mill mask, the method comprising:
    depositing one or more sacrificial layers above a substrate, wherein each of said one or more layers comprises a material susceptible to a reactive ion etching chemistry;
    applying a masking layer to at least a portion of the uppermost sacrificial layer; wherein said masking layer comprises a material not susceptible to the same reactive ion etching chemistry as the uppermost sacrificial layer;
    removing a portion of at least the uppermost sacrificial layer via reactive ion etching, thereby exposing a vertical surface of at least the uppermost sacrificial layer;
    removing the masking layer, thereby exposing a horizontal surface of at least the uppermost sacrificial layer;
    applying a coating of alumina forming a conformal deposition to said horizontal and vertical surfaces of the uppermost sacrificial layer, wherein said material is not susceptible to the same reactive ion etching chemistry as at least one of the sacrificial layers;
    removing the deposited material from the horizontal surface of the uppermost sacrificial layer so as to leave at least a portion of the coating on the vertical layer intact;
    removing the remaining one or more sacrificial layers via reactive ion etching, thereby leaving a side-wall patterned mill mask comprising the material forming a conformal deposition, wherein the mill mask has critical dimension uniformity of less than about 1 nm.

11. The method of claim 10, wherein the substrate comprises a read sensor stack comprising a plurality of layers.

12. The method of claim 10, wherein the coating of material forming a conformal deposition is applied via atomic layer deposition.

13. The method of claim 10, wherein the width of the side-wall patterned line structure is determined by the thickness of the coating of material forming a conformal deposition.

14. The method of claim 10, wherein the width of the side-wall patterned mill mask is within the range of 3 to 35 nm thick.

15. The method of claim 10, wherein the width of the side-wall patterned mill mask is within the range of 5 to 20 nm thick.

16. The method of claim 10, wherein the one or more sacrificial layers comprise a layer of amorphous carbon.

17. The method of claim 10, wherein the one or more sacrificial layers comprise a layer of tantalum.

18. The method of claim 10, wherein at least one of the one or more sacrificial layers is deposited via vapor deposition.

19. The method of claim 10, wherein the masking layer is applied as a photoresist pattern.

20. The method of claim 10, wherein the substrate comprises an uppermost layer comprising a material susceptible to a reactive ion etching chemistry different from any of the one or more sacrificial layers.

21. The method of claim 17, wherein the uppermost substrate layer comprises silicon carbide (SiC).

22. The method of claim 17, wherein the substrate further comprises an etch stop layer directly beneath the uppermost substrate layer, wherein the etch stop layer is not susceptible to the same reactive ion etching chemistry as the uppermost substrate layer.

23. The method of claim 19, wherein the etch stop layer comprises a chromium (Cr) layer.

* * * * *